United States Patent
Voskamp

(10) Patent No.: US 10,078,626 B1
(45) Date of Patent: Sep. 18, 2018

(54) AUTOMATED LAYOUT TESTING OF CONTENT

(71) Applicant: Amazon Technologies, Inc., Reno, NV (US)

(72) Inventor: Edwin Voskamp, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 541 days.

(21) Appl. No.: 13/686,154

(22) Filed: Nov. 27, 2012

(51) Int. Cl.
*G06F 17/22* (2006.01)

(52) U.S. Cl.
CPC .................................. *G06F 17/2247* (2013.01)

(58) Field of Classification Search
CPC ...... G06F 17/21; G06F 17/211; G06F 17/218; G06F 17/22; G06F 17/2229; G06F 17/2247; G06F 17/24; G06F 17/248; G06F 17/27; G06F 17/2725
USPC ................... 715/234–238, 243, 248
See application file for complete search history.

(56) References Cited

U.S. PATENT DOCUMENTS

| | | | | |
|---|---|---|---|---|
| 5,748,186 A * | 5/1998 | Raman | ............... | G06F 17/30017 707/E17.009 |
| 6,915,454 B1 * | 7/2005 | Moore | ................. | G06F 11/0709 714/38.14 |
| 7,131,066 B1 * | 10/2006 | Birsan | ............... | G06F 17/30861 707/E17.005 |
| 7,502,995 B2 * | 3/2009 | Takagi et al. | ................. | 715/234 |
| 8,196,112 B1 * | 6/2012 | Cansizlar | ............ | G06F 11/3672 717/116 |
| 8,850,305 B1 * | 9/2014 | Kent | .............................. | 715/234 |
| 8,898,560 B1 * | 11/2014 | Kent | .............................. | 715/234 |
| 9,003,313 B1 * | 4/2015 | Cierniak | ........................ | 715/762 |
| 2002/0111963 A1 * | 8/2002 | Gebert et al. | ................. | 707/513 |
| 2003/0177175 A1 * | 9/2003 | Worley et al. | ................. | 709/203 |
| 2004/0230889 A1 * | 11/2004 | Ishiyama et al. | .......... | 715/501.1 |
| 2004/0261038 A1 * | 12/2004 | Ording | .................. | G06F 3/0481 715/792 |
| 2005/0027823 A1 * | 2/2005 | Rana | ............................ | 709/219 |
| 2005/0076295 A1 * | 4/2005 | Simske | ............. | G06K 9/00442 715/243 |
| 2006/0110043 A1 * | 5/2006 | Reissman | ............... | G06K 9/469 382/203 |
| 2006/0198555 A1 * | 9/2006 | Hosotsubo | .............. | G06T 11/60 382/162 |
| 2007/0126793 A1 * | 6/2007 | Yamakado | ............ | G06F 17/212 347/43 |

(Continued)

OTHER PUBLICATIONS

Tali Garsiel; How Browsers Work; Feb. 20, 2010; taligarsiel.com; pp. 1-26.*

(Continued)

*Primary Examiner* — Andrew R Dyer
(74) *Attorney, Agent, or Firm* — Eversheds Sutherland (US) LLP

(57) ABSTRACT

Described herein are systems and methods for automatically verifying layout of content such as web pages, e-books, and so forth which comprise a markup language. The content is rendered in a headless browser without presentation to a display to generate a document object model ("DOM") for the content. The DOM is used to generate a DOM vector array which may be analyzed to determine layout errors such as blocks of content overlaying one another, improper placement of critical elements, and so forth.

16 Claims, 9 Drawing Sheets

(56) References Cited

U.S. PATENT DOCUMENTS

| | | | |
|---|---|---|---|
| 2007/0256010 A1* | 11/2007 | Blackmon | G06F 17/212 |
| 2008/0127341 A1* | 5/2008 | Chen | G06F 11/3608 |
| | | | 726/22 |
| 2009/0006944 A1* | 1/2009 | Dang | G06F 17/272 |
| | | | 715/234 |
| 2009/0030976 A1* | 1/2009 | Shukla | H04L 65/4015 |
| | | | 709/203 |
| 2009/0307603 A1* | 12/2009 | Gowda et al. | 715/749 |
| 2010/0220923 A1* | 9/2010 | Davan | G06K 9/00463 |
| | | | 382/164 |
| 2010/0329573 A1* | 12/2010 | Tsujino | G06K 9/00463 |
| | | | 382/209 |
| 2011/0167333 A1* | 7/2011 | Sakata | 715/234 |
| 2011/0276946 A1* | 11/2011 | Pletter | 717/124 |
| 2012/0106794 A1* | 5/2012 | Iwasaki | G06T 7/215 |
| | | | 382/103 |
| 2012/0166933 A1* | 6/2012 | Cui | G06F 17/2725 |
| | | | 715/234 |
| 2013/0227078 A1* | 8/2013 | Wei et al. | 709/219 |

OTHER PUBLICATIONS

CSS Height and Width; Oct. 26, 2006; quackit.com; pp. 1-2.*

Nicolas Perriault; Scrape and test any webpage using PhantomJS; Aug. 27, 2011; Nicolas.perriault.net; pp. 1-8.*

Joe Kuan; PhantomJs: The best way to save rendered HTML page into an image file; Oct. 3, 2012; pp. 1-4.*

PhantomJS: minimalistic headless WebKit-based JavaScript-driven tool; Jan. 23, 2011; ariya.blogspot.com; pp. 1-5.*

"Bundles;" TextMate Manual; Jun. 1, 2008; Macromates.com; pp. 1-8.*

"Tolerance;" Nov. 10, 2012; Merriam-Webster; www.m-w.com; pp. 1-2.*

\* cited by examiner

AUTOMATED LAYOUT TESTING OF CONTENT

BACKGROUND

A wide variety of content is available for consumption using markup languages and scripts such as hyper-text markup language ("HTML"), cascading style sheets ("CSS"), extensible markup language ("XML"), JAVASCRIPT ("JS"), and so forth. This content may be presented to users on user devices such as eBook readers, smartphones, tablets, notebook computers, and more.

The amount of content which is created or changed grows continuously, along with an ever growing array of different user devices which present this content. Traditional verification of content layout requires significant human intervention.

Figure 1:
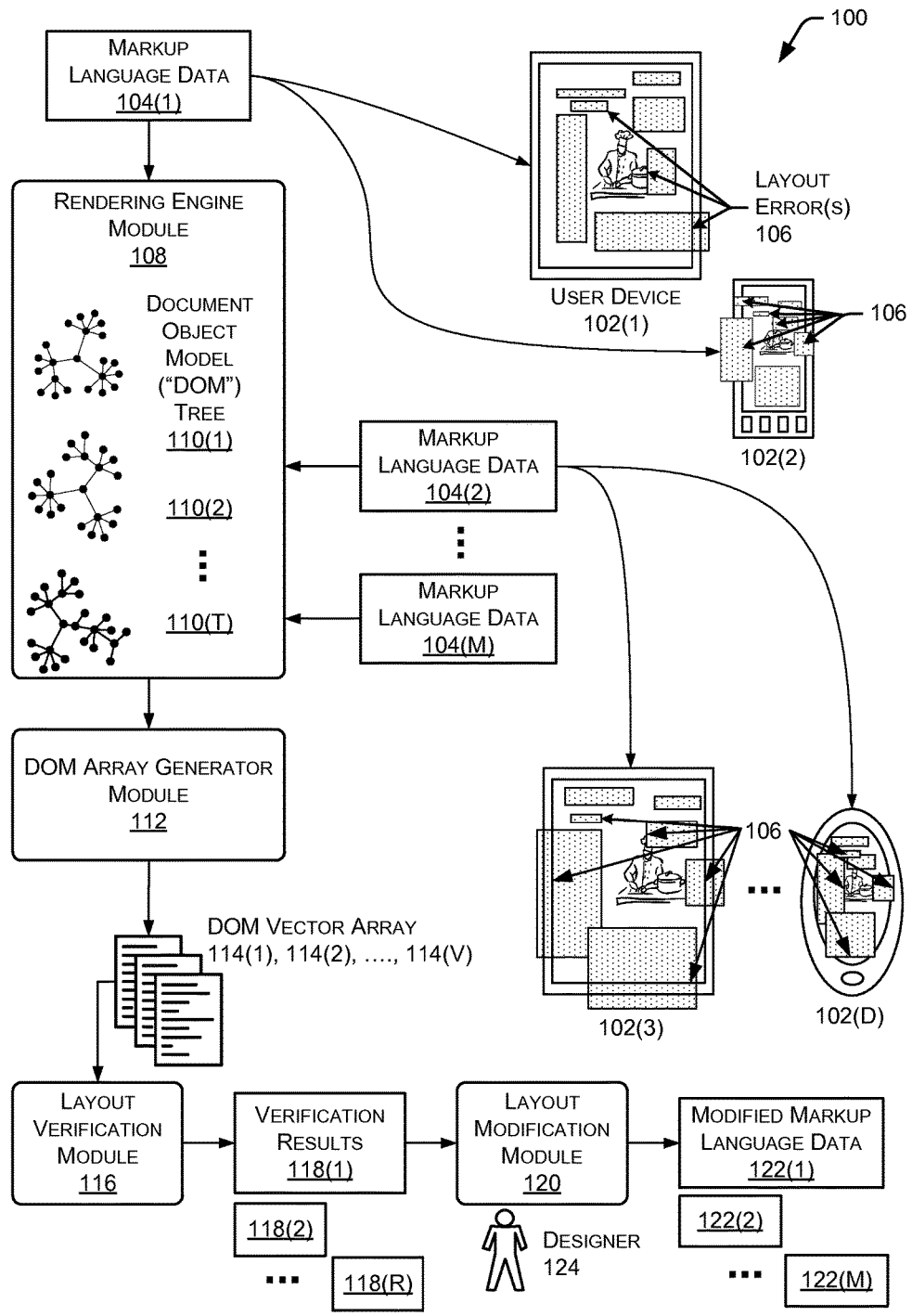
FIG. 1 illustrates a system for automated layout verification by rendering content comprising markup language data in a headless browser to generate a document object model ("DOM") and generate a DOM vector array.

Certain implementations will now be described more fully below with reference to the accompanying drawings, in which various implementations and/or aspects are shown. However, various aspects may be implemented in many different forms and should not be construed as limited to the implementations set forth herein. Like numbers refer to like elements throughout.

DETAILED DESCRIPTION

Verifying the layout and functionality of content such as web pages, e-books, and so forth has traditionally called for significant human intervention. For example, human operators may view rendered content to look for layout errors such as one block overlaying another, misplacement of elements, and so forth. Verification allows for detection and correction of errors which may result in undesirable user experience, operational problems, and so forth.

However, the amount of content which is created or changed grows continuously. This results in a situation where human resources may not be able to keep pace with new or changed content which should have layout verified before being provided to users.

This disclosure describes systems and methods for automatically verifying layout of content. The content is rendered by a rendering engine configured to process or parse the markup language, script, or other components in the content. The rendering engine may be configured to provide the output as non-visual data. For example, the rendering engine may comprise a headless browser configured to render the content without presentation on a display for use by a user.

As part of the rendering, the rendering engine generates a document object model ("DOM") tree for the content. The DOM tree for a piece of content may comprise an extensive tree with many nodes. For example, a web page used by an online merchant may have a DOM tree with thousands of nodes. Due to how the DOM tree is constructed, a particular element of the content may be affected by several nodes. As a result, analysis of data in the DOM tree may be resource intensive.

A DOM vector array may be generated based on the DOM tree. The DOM vector array provides information about the representation of the content in a format which exhibits relatively few hierarchical levels compared to the DOM tree. For example, the DOM vector array may comprise entries at a single hierarchical level.

A layout verification module is configured to analyze the DOM vector array. This analysis may include comparing the DOM vector array or portions of the rendered content with one or more layout rules. For example, a layout rule may define particular placement of a critical element when rendered on the user device. Use of the DOM vector array in the analysis may reduce resource consumption, such as processor time, as compared to analyzing the DOM tree directly.

Verification results may be generated based on the analysis, and provided to a designer or other responsible party. In some implementations recommended corrections may be provided as well. The designer may then correct layout errors to produce modified markup language data. In some implementations, the correction of the layout errors may be at least partially automated.

Automation of the layout verification process for content allows for reduced verification time and increased access to verification. In one implementation, changes to content, such as a web page, may result in initiation of automated layout verification. Verification results indicative of layout errors may result in holding the deployment of the changed content until corrected. This process of verification and correction results in content which is presented as expected and may improve the overall user experience.

Illustrative System

FIG. 1 illustrates a system 100 for automated layout verification of content comprising a markup language. One or more user devices 102(1), 102(2), ... 102(D) may be used by one or more users. As used herein, letters enclosed by parenthesis such as "(D)" or "(U)" indicate an integer having a value greater than zero. The user devices 102 may include a smartphone, a laptop computer, a desktop computer, a tablet computer, portable media player, game consoles, in vehicle navigation system, kiosk, and so forth.

Content may be expressed in the form of markup language data 104. This markup language data 104 may use one or more of hyper-text markup language ("HTML"), cascading style sheets ("CSS"), extensible markup language ("XML"), JAVASCRIPT ("JS"), JAVASCRIPT Object Notation ("JSON"), and so forth. For example, content such as an e-book may be presented using a variation of HTML and CSS.

The markup language data 104 is provided to the user device 102 or an intermediate device such a rendering server for rendering and subsequent presentation. For example, the user device 102 may include a rendering engine which parses the markup language data 104 and generates output for presentation to the user of the user device 102. The output for presentation may include one or more visual, audible, or haptic outputs. For example, the user device 102 may include a display having particular display characteristics such as resolution, color capability, and so forth.

The markup language data 104 is configured to, when rendered by a rendering engine, present a particular user interface to the user via a presentation device such as a display or speaker. The markup language data 104 associated with particular content such as a web page or e-Book may include thousands of different elements which may be updated or administered by several different working groups or organizations. For example, the markup language data 104 describing a home web page for an online merchant may involve the efforts of a large number of employees.

Due to the ever changing nature of content, the markup language data 104 used to present that content may be modified or replaced. To maintain a positive user experience where the content renders as intended by the designers, verification of the markup language data 104 is performed.

This verification involves the identification of one or more layout errors 106. A layout error 106 occurs when actual presentation on the user device 102 deviates from a previously defined layout rule. The layout errors 106 may include, but are not limited to blocks overlaying one another, improper placement of a critical element, presenting an element at least partially beyond a display border, improper element provider, excessive complexity, and so forth. In one example, the layout rule may prohibit block items from overlaying one another. As a result, when two blocks impinge on one another, a layout error occurs. In another example, the layout rule may specify a critical element such as a legal notice or "purchase" control is to be presented in a particular way to the user, such as at the top of a web page. When the critical element is presented in another location, such as "below the fold" which would require the user to scroll down in order to view, a layout error occurs.

Layout errors 106 may occur for a variety of reasons including updates, internationalization of the content to different languages, and so forth. For example, a title of an American English version of an e-book may be "A Tale of Two Cities." In comparison, an international version of that e-book may have the title modified to read "A Tale of Two Cities—International Edition for English Speakers." This longer title may result in shifting of other elements such as bibliographic information, title graphics, and so forth off the display.

The layout errors 106 may also occur when content which is designed for rendering on one user device 102 is rendered on another user device 102. For example, the user devices 102(1) and 102(2) depicted in FIG. 1 have different form factors including display aspect ratios. Due to the difference in display aspect ratios, and potentially different rendering engines, the presented output may differ from that which is intended by the designers of the content. The layout errors 106 are discussed in more detail below with regard to FIG. 2.

Analysis of the markup language data 104 to determine layout errors 106 may begin with a rendering engine module 108 accessing the markup language data 104. The rendering engine module 108 may comprise a "headless browser". The "headless browser" is configured to render the markup language data 104 but without presentation to the user. In one implementation, the rendering engine module 108 may execute on a server which does not have a user accessible display upon which the rendered content may be presented.

The rendering engine module 108 parses the markup language data 104 and generates a document object model ("DOM") tree 110. The DOM tree 110 contains information about how elements in the markup language data 104 interact with one another and with plug-ins or external applications. As described in more detail below with regard to FIG. 3, a particular element such as a block may comprise data in several different nodes of the DOM tree 110. Said another way, the information about a particular element may be dispersed throughout the DOM tree 110. This dispersion increases the processing demands and complexity associated with analyzing the markup language data 104.

A DOM array generator module 112 is configured to accept the DOM tree 110 data and generate a DOM vector array 114. The DOM vector array 114 is a single-hierarchical data structure comprising entries which are representative of presentation of one or more elements expressed in the markup language data 104. For example, the DOM vector array 114 may comprise a flat file in which each row is information descriptive of each of the elements. The DOM vector array 114 may be implemented as a multidimensional array or an array of arrays. In some implementations the DOM vector array 114 may be programmatically expressed as a vector class in the C++ or other programming languages.

The DOM vector array 114 is provided to a layout verification module 116. The layout verification module 116 is configured to analyze the DOM vector array 114 with one or more layout rules. This analysis may include comparing the entries in the DOM vector array 114 with the one or more layout rules to determine a variance between the two. The variance is indicative of a divergence of the entry in the DOM vector array 114 from one or more conditions set forth in the one or more layout rules. The layout rules are discussed in more detail below with regard to FIG. 6. Use of the DOM vector array 114 which comprises data in a single-hierarchical format may reduce processing resources required for the analysis. For example, rather than various permutations of tree traversal necessary to compare elements in the DOM tree 110, a relatively simple search of the DOM vector array 114 suffices to determine when two elements overlay one another.

The layout verification module 116 may also use the DOM vector array 114 for verification of elements such as JAVASCRIPT popup boxes which are configured to overlap other elements during intended operation. For example, using the DOM vector array 114, these elements may be verified to confirm a particular position on the display when triggered. Elements which are optional or conditional may also be verified by the layout verification module 116 using the DOM vector array 114.

The layout verification module 116 may generate verification results 118. These verification results 118 may describe one or more layout errors 106 in the markup language data 104. The verification results 118 are discussed in more detail below with regard to FIG. 7.

To facilitate verification of markup language data 104, a plurality of systems 100 may be used. In some implementations these systems 100 may be provided as virtual servers in a cloud computing environment. For example, the markup language data 104 may be designated for verification against three different types of devices, each of which may have a landscape and a portrait orientation for rendering. To test against these six different combinations, six systems may be used in parallel, each processing a different permutation, to complete the verification more rapidly.

A layout modification module 120 may accept the verification results 118. Based at least in part on the verification results 118, the layout modification module 120 may generate modified markup language data 122. The modified markup language data 122 is configured to correct one or more of the layout errors 106 which were specified in the verification results 118. For example, the modified markup language data 122 is configured to be presented by the user device 102 without layout errors 106.

In one implementation, the layout modification module 120 may be configured to present the markup language data 104 and the corresponding verification results 118 to a designer 124 or other human operator. The designer 124 may take corrective action, such as resolving the layout errors 106.

In another implementation, the layout modification module 120 may be configured to automatically modify the markup language data 104 to correct the one or more layout errors 106. For example, the layout modification module 120 may be configured to reposition a critical element to bring it into compliance with the layout rules.

The layout modification module 120 may provide for manual and automated correction of layout errors 106. For example, some layout errors 106 may be corrected automatically while others are flagged for resolution by the designer 124.

Figure 2:
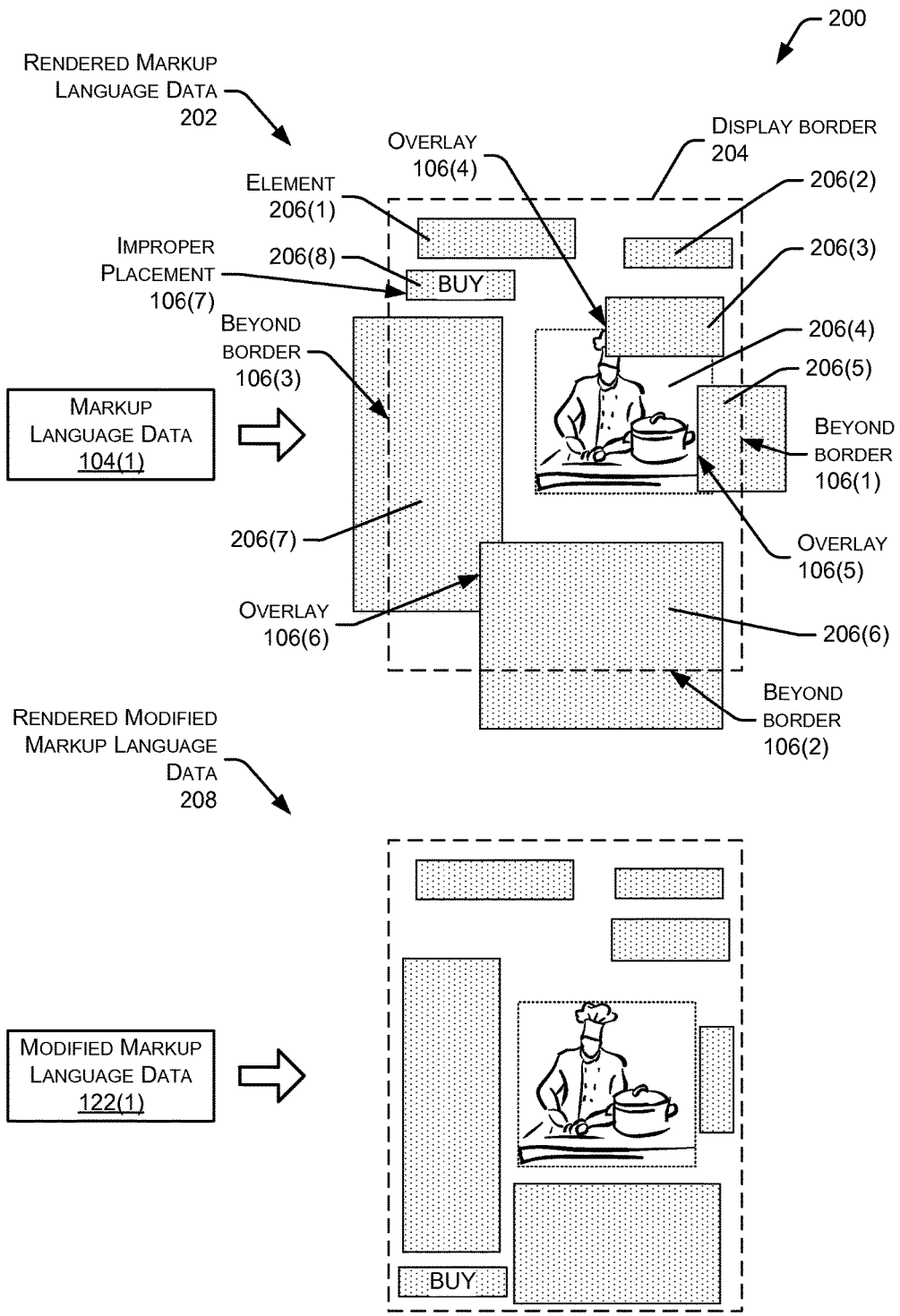
FIG. 2 illustrates renderings of markup language data with layout errors and modified markup language data without the layout errors.

FIG. 2 illustrates renderings 200 of the markup language data 104 with layout errors 106 and the modified markup language data 122 without the layout errors 106. As described above, the markup language data 104 may sometimes experience layout errors 106 when rendered. These layout errors 106 may include elements which extend beyond a display border 204, require excessive time to render on the user device 102, and so forth.

A rendered markup language data 202 is depicted, such as would be presented on the user device 102. The markup language data 104 includes information on one or more elements 206. These elements 206 may include inline elements, block elements, and so forth. By way of illustration and not as a limitation, elements 206(1)-(8) are depicted here. The markup language data 104 may in some implementations include thousands of elements 206 or more.

In this illustration elements 206(5), 206(6), and 206(7) would, when rendered, extend beyond the display border 204. As a result, the layout verification module 116 may generate verification results 118 indicating beyond border layout errors 106(1), 106(2), and 106(3).

Some block elements may overlay one another, such that they impinge or overlap on one another. Overlays may be undesirable in that they may degrade the user experience by obscuring elements 206. As shown here, elements 206(3) and 206(4) overlay one another, 206(4) and 206(5) overlay one another, and 206(6) and 206(7) overlay one another. These overlays may prevent the user from seeing portions of the elements 206 which are blocked. The layout verification module 116 may generate verification results 118 indicating overlay layout errors 106(4), 106(5), and 106(6).

Some elements may have their placement defined by one or more element placement parameters. The element placement parameters may specify a location, relative position, sequence of presentation to the user, and so forth for one or more elements 206. This parameter may specify where the one or more elements 206 are permitted or disallowed during presentation of data to the user. Critical elements such as navigation or purchase controls may also specify element placement parameters. For example, a critical element 206(8) comprising a purchase control is improperly presented at the top of the page instead of at the bottom. When analyzed against the layout rules, the layout verification module 116 may generate verification results 118 indicating an improper placement layout error 106(6).

Once corrective action has been taken, the modified markup language data 122 may be distributed for use. Illustrated here is rendered modified markup language data 208. As shown, the various elements are presented and free from the layout errors 106 described above. The user interface intended by the designer 124 is provided that enhances the user experience as compared to the rendered markup language data 202 with layout errors 106.

Figure 3:
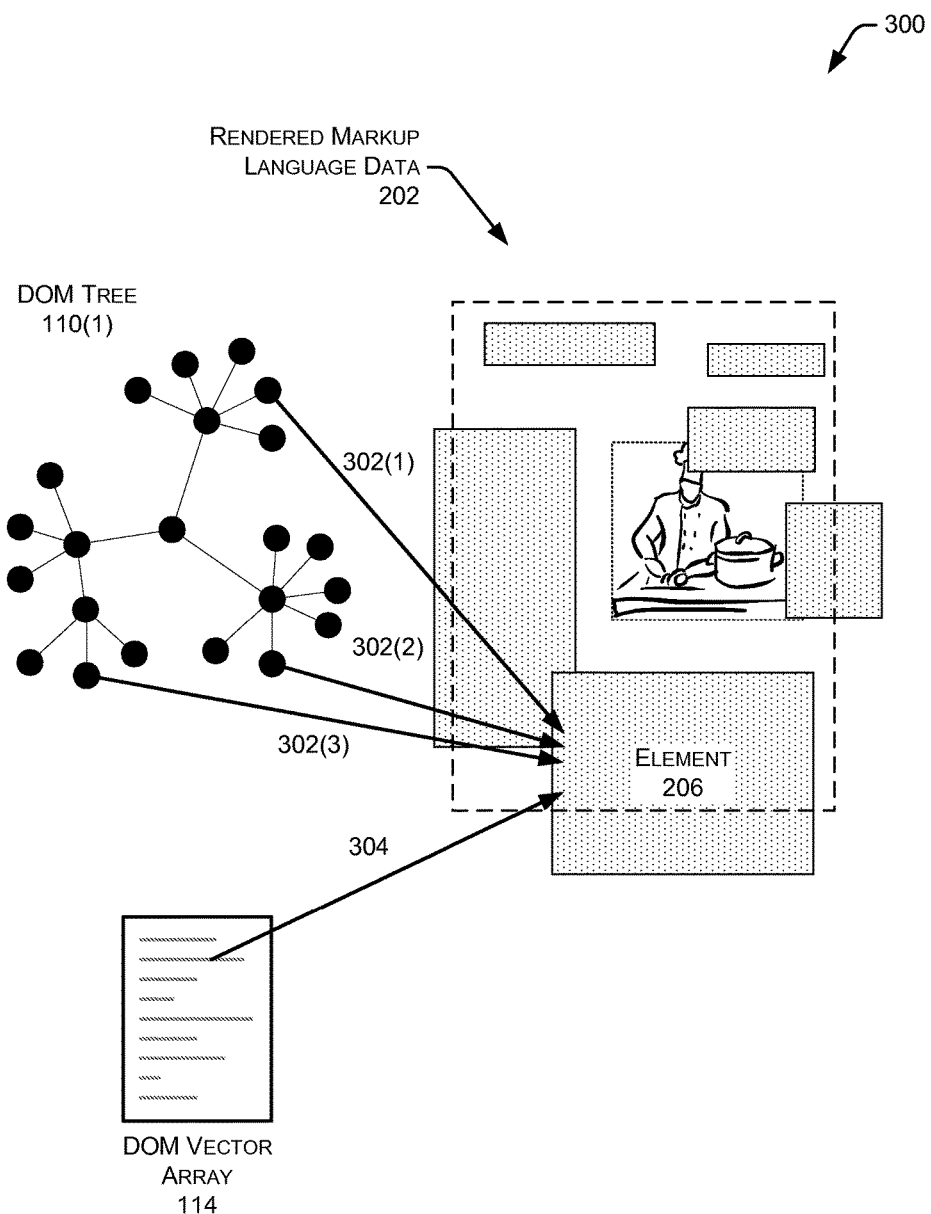
FIG. 3 illustrates correspondence of the document object model ("DOM") tree to elements in the markup language data and to the DOM vector array.

FIG. 3 illustrates correspondence 300 of the document object model ("DOM") tree 110 to elements in the markup language data 104 and to the DOM vector array 114. As described above, the rendering engine module 108 is configured to render the markup language data 104 and generate the DOM tree 110.

The DOM tree 110 is hierarchical in that placement in the tree conveys information. Furthermore, information about a particular element may be dispersed in that the element may be referenced in various nodes of the DOM tree 110 rather than in a single node or group of immediately connected nodes. For example, as illustrated here the DOM tree 110(1) may have three references 302(1)-(3) located at different nodes which affect a single element 206. The dispersion increases the processing demands and complexity associated with analyzing the markup language data 104, compared to the use of the DOM vector array 114. For example, determining the rendering of the element 206 would require traversing the DOM tree 110 several times to find all of the nodes associated with the element 206. For markup language data 104 which incorporates tens of thousands of elements 206, this becomes computationally significant.

In comparison to the DOM tree 110, the DOM vector array 114 provides a single reference 304 to the element 206. As a result, the DOM vector array 114 requires fewer resources to traverse and analyze.

Figure 4:
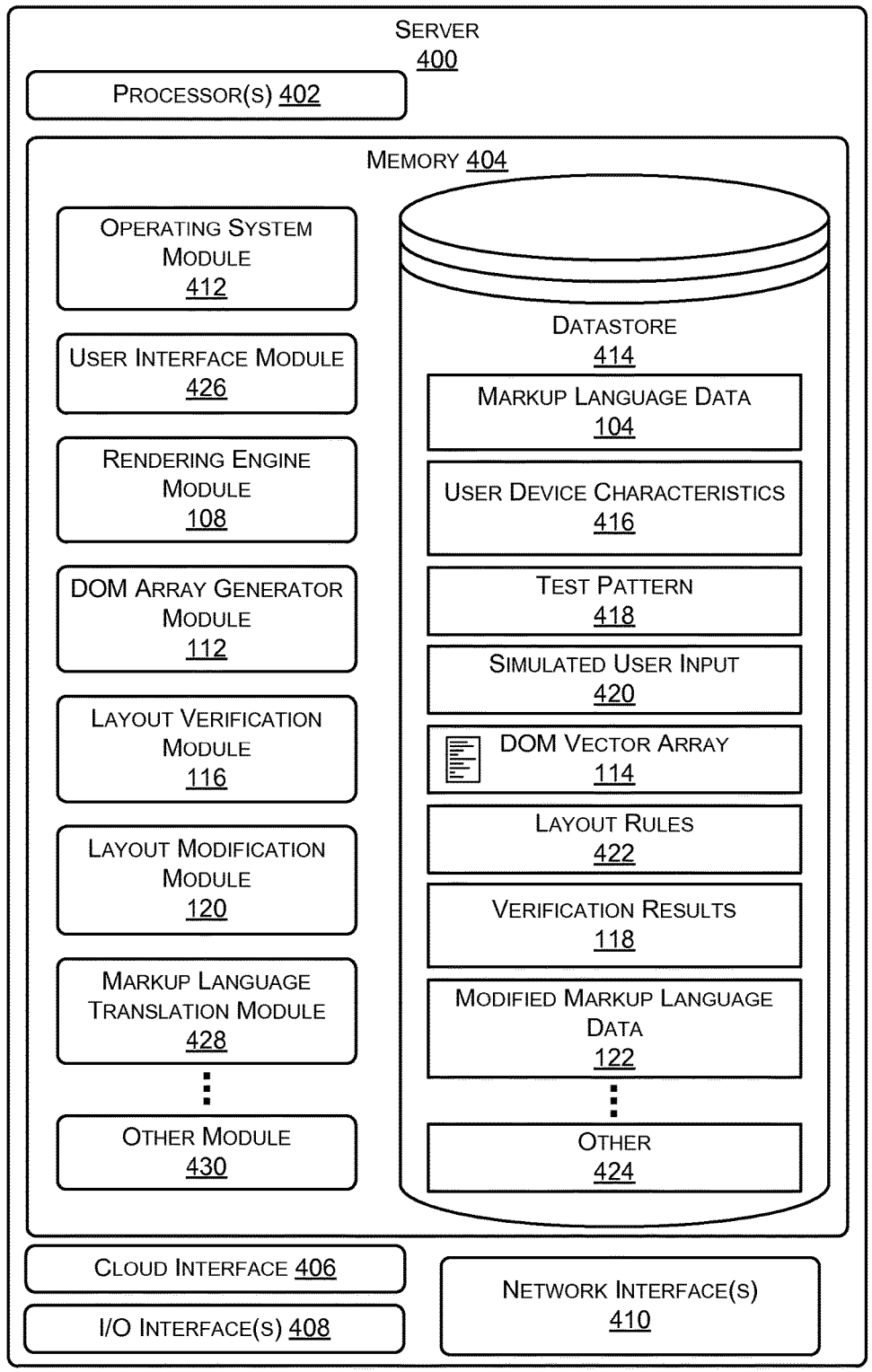
FIG. 4 illustrates a block diagram of a server configured to provide the layout verification using the DOM vector array and one or more user device characteristics and layout rules.

FIG. 4 illustrates a block diagram of a server 400 configured to provide the layout verification described herein. The server 400 may comprise one or more processors 402, one or more memories 404, one or more cloud interfaces 406, one or more input/output ("I/O") interfaces 408, and one or more network interfaces 410.

The processor 402 may comprise one or more cores and is configured to access and execute at least in part instructions stored in the one or more memories 404. The one or more memories 404 comprise one or more computer-readable storage media ("CRSM"). The one or more computer-readable storage media may include, but is not limited to, random access memory ("RAM"), flash RAM, magnetic media, optical media, and so forth. The one or more memories 404 may be volatile in that information is retained while providing power or non-volatile in that information is retained without providing power.

The cloud interface 406 is configured to couple the server 400 to one or more other servers 400 in a datacenter. For example, the cloud interface 406 may comprise a backplane interface configured to allow communication between server blades. The one or more I/O interfaces 408 may also be provided in the server 400. These I/O interfaces 408 allow for coupling devices such as keyboards, external memories, infrared transceivers, microphones, speakers, and so forth to the server 400.

The one or more network interfaces 410 provide for the transfer of data between the server 400 and another device, such as via a network. The network interfaces 410 may include, but are not limited to, wired local area networks ("LANs"), wireless local area networks ("WLANs"), wireless wide area networks ("WWANs"), personal area networks ("PANs"), and so forth.

The one or more memories 404 may store code or program instructions for execution by the processor 402 to perform certain actions or functions. These instructions may include an operating system module 412 configured to manage hardware resources such as the cloud interface 406 and the I/O interfaces 408 and provide various services to applications executing on the processor 402. The one or more memories 404 may also store a datastore 414 containing information about the operating system module 412, the markup language data 104, user device characteristics 416, test patterns 418, simulated user input 420, the DOM vector array 114, layout rules 422, the verification results 118, the modified markup language data 122, and other information 424.

The user device characteristics 416 describe the presentation and operational characteristics associated with the user device 102. These may include display characteristics, such as display resolution, color capability, and so forth. The layout verification module 116 may use the user device characteristics 416 to verify that the user device 102 can present the markup language data 104 in compliance with the layout rules 422. The user device characteristics 416 are discussed below in more detail with regard to FIG. 5.

A test pattern 418 sets out a sequence of events to be used during the analysis by the layout verification module 116. In some implementations the test pattern 418 may comprise a script configured to load particular user device characteristics 416, retrieve and apply the simulated user input 420, select the layout rules 422, and so forth. Different test patterns 418 may be selected for use against the markup language data 104. For example, an extensive test pattern 418 may be used for detailed verification, while a shorter test pattern 418 may be used to test a smaller set of specified functions.

The simulated user input 420 provides input equivalents to simulate the interaction a user may have with the presented markup language data 104. The simulated user input 420 may include simulated keyboard entries, mouse movements, touches, swipes, verbal input, motion input, and so forth. For example, the simulated user input 420 may include behaviors such as the user touching a particular critical element 206 as presented on a touch screen.

The layout rules 422 set forth conditions against which the layout verification module 116 can test to determine whether the presentation of the markup language data 104 is acceptable. These layout rules 422 may include whether overlays are tolerated, a maximum number of layers, presentation size, and so forth. The layout rules 422 may be added to, modified, or removed using an interface, such as the user interface provided by the user interface module 426. The layout rules 422 are discussed below in more detail with regard to FIG. 6.

Other data 424 may also be present, such as last date and time of verification for the markup language data 104.

The one or more memories 404 may include a user interface module 426, the rendering engine module 108, the DOM array generator module 112, the layout verification module 116, the layout modification module 120, a markup language translation module 428, and other modules 430. In some implementations one or more of these modules or their functions may be stored or executed on another device accessible using the network interface 410.

The user interface module 426 is configured to present information to the designer 124 or another user, and may be configured to accept user input. The user interface module 426 may provide graphical user interfaces, audible user interfaces, and so forth. The user interface module 426 may be configured to enable the designer 124 or another user to initiate verification of the markup language data 104, change the layout rules 422, and so forth.

As described above, the rendering engine module 108 is configured to parse the markup language data 104 and generate the DOM tree 110. The rendering engine module 108 may comprise a "headless browser" which is not configured to present the rendered output to the user. For example, as shown here, the server 400 omits a display upon which to present the rendered output to the end user, or a mechanism to output an image of the rendered output to the user. In some implementations the rendering engine module 108 may be a "headless browser" in that it lacks a graphical user interface used for interacting with an end-user. However, the rendering engine module 108 may provide output data to other modules, such as the DOM array generator module 112. In some implementations, the rendering engine module 108 may include a command-line interface.

The DOM array generator module 112 processes the DOM tree 110 to generate the DOM vector array 114. The layout verification module 116 may then access one or more of the markup language data 104, user device characteristics 416, the test pattern 418, the simulated user input 420, the DOM vector array 114, or the layout rules 422. Based at least in part upon one or more of these, the layout verification module 116 is configured to generate the verification results 118. These layout verification results 118 indicate one or more layout errors 106 present in the markup language data 104.

The layout modification module 120 allows for correction of one or more of the layout errors 106. For example, the designer 124 may make changes to the markup language data 104 using the user interface module 426 to generate modified markup language data 122 which presents without layout errors 106.

In some implementations the markup language data 104 may be in a format or language which is not native to the rendering engine module 108. For example, a first markup language may use XML to render e-books on the user device 102 which is incompatible with the rendering engine module 108. The markup language translation module 428 may use an extensible stylesheet language transformation ("XSLT") to translate the first markup language to a second markup language, such as in a form of XML recognizable by the rendering engine module 108. The markup language translation module 428 thus allows the system to verify content using different markup languages.

The server 400 may include other modules 430. These other modules 430 may include decryption modules, user authentication modules, and so forth.

Figure 5:
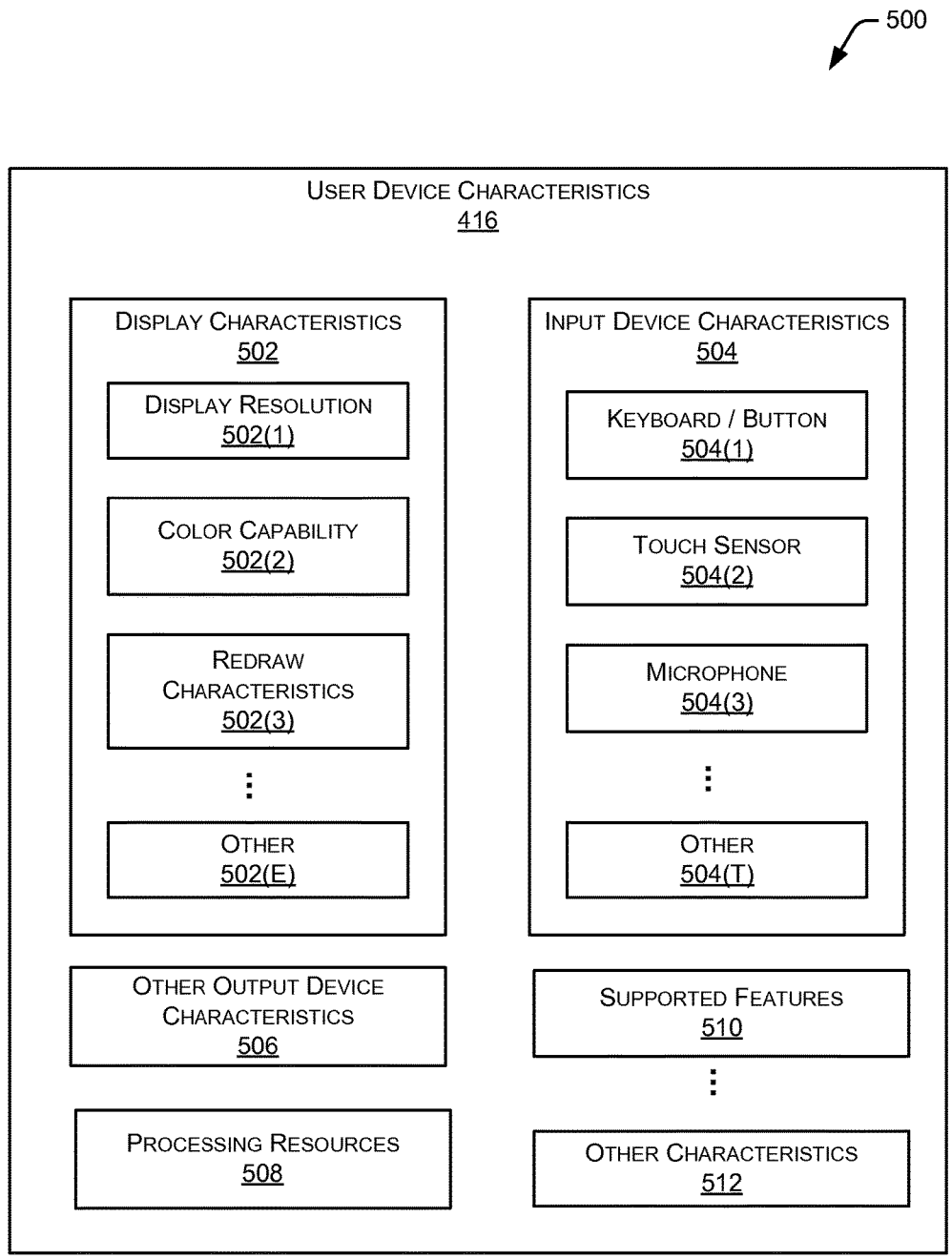
FIG. 5 illustrates a block diagram of the user device simulation characteristics.

FIG. 5 illustrates a block diagram 500 of the user device characteristics 416. As described above, the user device characteristics 416 describe the presentation and operational characteristics associated with the user device 102. This may be an actual deployed user device 102, a prototype user device 102, or a proposed user device 102 which has not yet been constructed. For example, a user device manufacturer may store the user device characteristics 416 of a proposed tablet computer. In another example, the user device characteristics 416 of previous generations of user devices which are still in use but no longer available may be stored and used for verification. Once stored, the characteristics may be used to verify that current popular content will present properly on this proposed user device 102.

The user device characteristics 416 may include display characteristics 502, input device characteristics 504, other output device characteristics 506, processing resources 508, supported features 510, and other characteristics 512. The display characteristics 502 may include one or more of display resolution 502(1), color capability 502(2), redraw characteristics 502(3), and other 502(E) information about the display present in the user device 102. The display resolution 502(1) may include information about the height and width of the display in pixels. The color capability 502(2) may include information about whether the display is monochrome or color, available color gamut, and so forth.

The redraw characteristics 502(3) provide details about how the display will present a particular image. For example, where the display comprises an electrophoretic material, the redraw characteristics 502(3) may provide information about waveforms used to generate a particular image, screen flashes, and so forth.

The input device characteristics 504 provide information about the devices which the user may use to enter input to the user device 102. These may include one or more of a keyboard/button 504(1), touch sensor 504(2), microphone 504(3), or other 504(T) input device characteristics 504. The layout verification module 116 may use these input device characteristics 504 to generate the simulated user input 420 appropriate to the user device 102. For example, where the user device 102 accepts touch input using a touch sensor, the simulated user input 420 may include simulated taps, swipes, and pinches.

The other output device characteristics 506 may include information such as whether a speaker, haptic output device, and so forth are available and what outputs they are capable of generating. Processing resources 508 may be specified in the user device characteristics 416. The processing resources 508 may specify available computational capability, memory, and so forth. For example, the layout verification module 116 may be configured to verify that the markup language data 104 will execute within a pre-determined period of time given a particular processor in the user device 102.

Supported features 510 may be included in the user device characteristics 416. The supported features 510 may include available applications, plug-ins, codecs, and so forth. For example, where the markup language data 104 calls for presentation of a particular video format, the layout verification module 116 may be configured to check the supported features 510 to confirm that the appropriate codec necessary for playback is available.

Other characteristics 512 of the user device characteristics 416 may be stored. For example, the other characteristics 512 may indicate presence of a dedicated digital rights management module in the user device 102.

Figure 6:
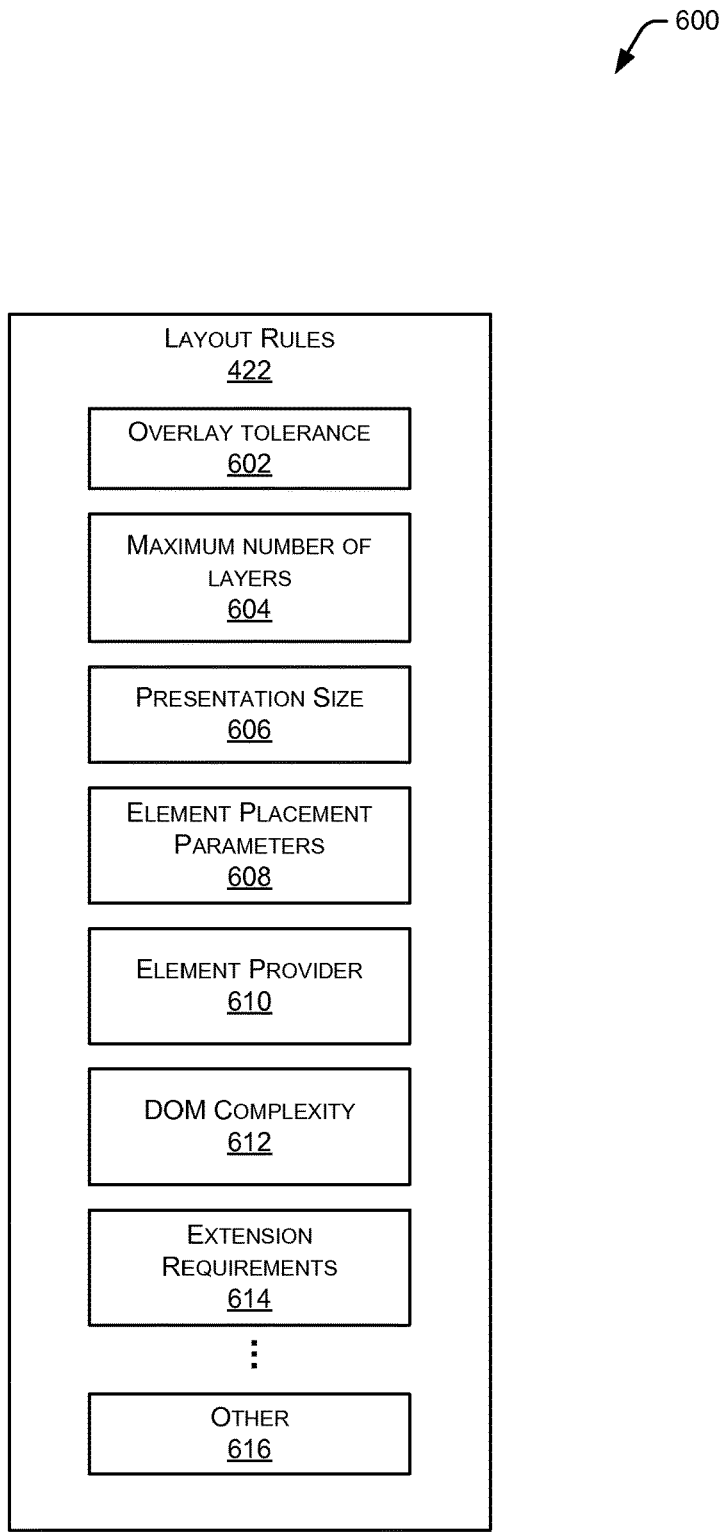
FIG. 6 illustrates a block diagram of the layout rules.

FIG. 6 illustrates a block diagram 600 of the layout rules 422. As described above, the layout rules 422 set forth conditions against which the layout verification module 116 can test to determine whether the presentation of the markup language data 104 is acceptable. The testing may include comparing an entries in the DOM vector array 114, which is representative of the presentation of the markup language data 104, with the layout rules 422 to determine a variance between the two. The variance is indicative of a divergence of the entry in the DOM vector array 114 from one or more conditions set forth in the one or more layout rules 422.

It is recognized that conditions set forth in the layout rules may be specified in several ways. For example, the layout rules 422 may specify conditions which, when met, result in a "pass" of an element 206. Continuing the example, the layout rules 422 may specify conditions which, when met, result in a "fail" of an element 206.

The layout rules 422 may include an overlay tolerance 602 which specifies whether two or more blocks overlaying one another constitutes a layout error 106. An overlay occurs when two or more blocks impinge on the same area during presentation. For example, as described above with regard to FIG. 2 the overlay error 106(4) exists when the element 206(3) overlaps a portion of the element 206(4). The overlay tolerance 602 may be configured such that no overlays are permissible, or varied to allow up to a pre-determined threshold of overlay. For example, an overlay of up to five rows or columns of pixels may be permissible.

A maximum number of layers 604 used in the presentation may be specified. Some rendering engines used by the user devices 102 may be limited to processing a pre-determined number of layers. Layers, such as those used in JAVASCRIPT, allow positioning of overlapping transparent or opaque blocks of markup language content, such as that using HTML, at a particular location on a rendered page. The maximum number of layers 604 may be used to verify proper operation. For example, an improperly designed markup language data 104(1) may contain more layers than a particular model of user device 102 is capable of properly rendering.

A presentation size 606 may be specified, such as particular pixel height and width available for presentation of the content. For example, the markup language data 104 may be configured to be presented in a 640×480 window.

Element placement parameters 608 may be specified which designate a relative or absolute placement for an element 206. Relative placement indicates the position of the element 206 relative to another element, such as element 206(8) being below element 206(7). The element placement parameters 608 may be specified for a critical element. For example, a purchase control may be configured to be presented at the bottom of the display during presentation. In comparison, absolute placement may specify a particular set of coordinates at which the element is to be placed.

The layout rules 422 may also include performance related rules. Element provider 610 may specify a type, address, or other designator of one or more servers which are to deliver that particular element 206. For example, images which are referenced in the markup language data 104 may be designated for retrieval from a content delivery network rather than from a single server.

DOM complexity 612 may be compared to a predetermined level of maximum complexity. The level of maximum complexity may be determined based at least in part on the capability of the user device 102 to render the markup language data 104 within a predetermined amount of time. For example, the DOM vector array 114 may be analyzed by the layout verification module 116 to determine that the DOM tree 110 contains a number of elements in excess of the maximum complexity. By providing this information in the verification results 118, the markup language data 104 may be modified to execute more quickly using the resources available on the user device 102.

Extension requirements 614 may be checked. The system 100 may be configured to test the markup language data 104 as if rendered by different types and versions of browsers. In one example, the system 100 may be configured to verify the markup language data 104 as if rendered by INTERNET EXPLORER® from MICROSOFT® and confirm the presence and operation of ACTIVEX® elements. In another example, the system may be configured to verify the markup language data 104 as if rendered by MOZILLA® FIREFOX® by the MOZILLA FOUNDATION and confirm the presence and operation of elements using FLASH® from ADOBE SYSTEMS INC.

Other 616 rules may be specified, such as maximum resolution of an image, minimum distance between elements, and so forth.

Figure 7:
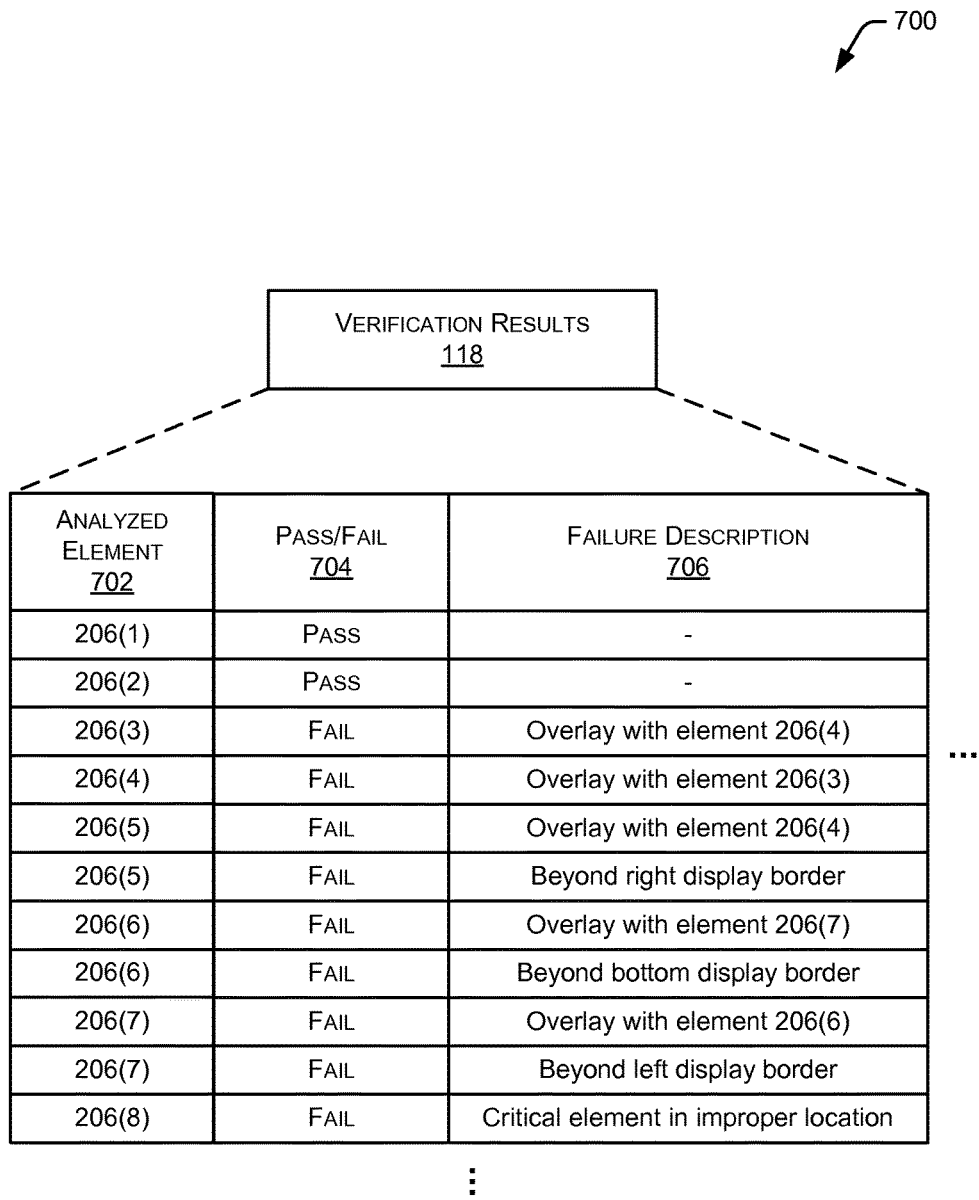
FIG. 7 illustrates verification results.

FIG. 7 illustrates a block diagram 700 of the verification results 118. As described above the layout verification module 116 is configured to generate verification results 118. These verification results 118 indicate compliance state with regard to the one or more layout rules 422 and so forth.

The verification results 118 may include data such as an analyzed element 702, pass/fail 704, and failure description 706. The analyzed element 702 indicates the particular element 206 as described in the markup language data 104. For example, the analyzed elements 206(1)-(8) as shown in FIG. 2.

The pass/fail 704 indicates whether the particular element was compliant with the one or more layout rules 422. In some implementations the pass/fail 704 may indicate different levels of compliance. For example, the one or more layout rules 422 may include guidelines or suggestions which are not mandatory for compliance but are recommended. As a result, the pass/fail 704 may indicate states such as "pass," "acceptable," "potential problem," and "fail"

The failure description 706 may include information about the compliance. This failure description 706 may comprise an error code, verbose description, and so forth. For example, as shown here, the analyzed element 702 of 206(4) has failed with a description of "overlay with element 206(3)." As depicted here, individual elements 206 may have multiple entries due to multiple layout errors 106. For example, the element 206(5) exhibits two layout errors 106.

Illustrative Process

Figure 8:
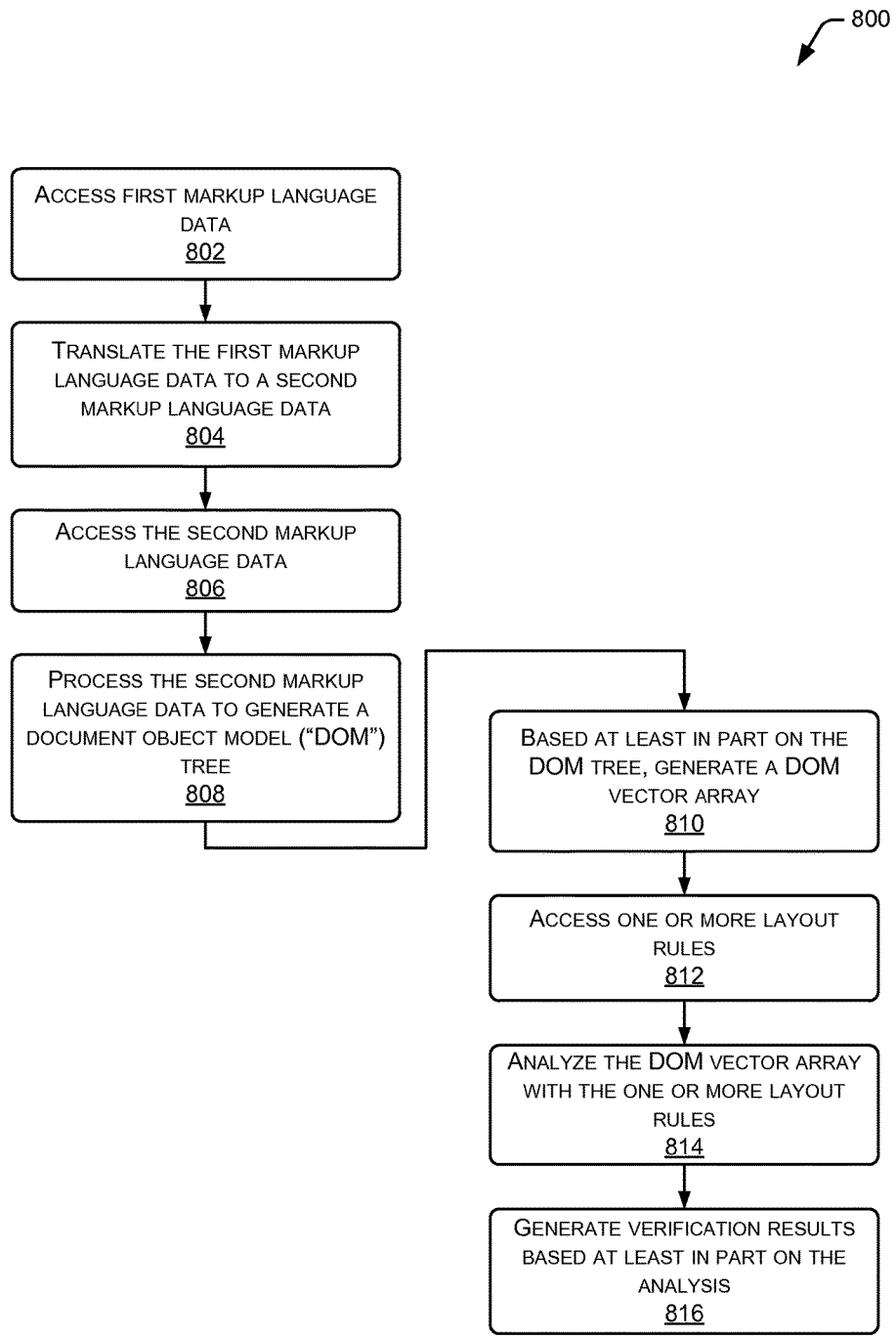
FIG. 8 illustrates a flow diagram of a process of verifying layout based at least in part on the DOM vector array.

FIG. 8 illustrates a flow diagram 800 of a process of verifying layout of the markup language data 104. This process may be implemented by the server 400 or other devices executing one or more of the rendering engine module 108, the DOM array generator module 112, the layout verification module 116, the layout modification module 120, or the markup language translation module 428.

As described above, in some implementations, the rendering engine module 108 may be configured to accept a particular format or version of the markup language data 104. For example, content may include in the markup language data 104 a first format of XML while the rendering engine module 108 is able to process a second type of XML. In this situation, block 802 accesses the first markup language data 104(1) in the first format.

Block 804 translates the first markup language data 104 (1) to a second markup language data 104(2). For example, the markup language translation module 428 may be configured to use an extensible stylesheet language transformation ("XSLT") to translate the first markup language to a second markup language, such as in a form of XML recognizable by the rendering engine module 108. Other operations may also be performed, such as executing scripts and translating the output. Where translation of the markup language data 104 is not used, the process may begin at block 806.

Block 806 accesses the markup language data 104, such as the second markup language data 104(2) as translated above. For example, the rendering engine module 108 may retrieve the markup language data 104 from the datastore 414.

Block 808 processes the markup language data 104 to generate a document object model ("DOM") tree 110. For example, the rendering engine 108 parses the markup language data 104. As described above the rendering may comprise processing the markup language data 104 with a headless browser without presentation to a user.

In some implementations, the processing may comprise injecting or applying one or more of the simulated user inputs 420. For example, the simulated user input 420 comprising clicks, mouse overs, touches, and so forth may be provided, providing simulated user interaction with the markup language data 104.

Block 810, based at least in part on the DOM tree 110, generates a single-hierarchical DOM data file describing one or more elements 206 in the markup language data 104 as expressed in the DOM tree 110. The single-hierarchical DOM data file may comprise the DOM vector array 114 containing information about the one or more elements 206.

Block 812 accesses one or more of the layout rules 422. As described above with regard to FIG. 6, the one or more layout rules 422 may include one or more of the overlay tolerance 602, a number of layers permitted for an element 206, the maximum number of layers permitted 604, the presentation size 606, the element placement parameters 608, and so forth. For example, the overlay tolerance 602 may be specified such that no overlays are permitted.

In some implementations, the one or more layout rules 422 may be based at least in part on one or more user device characteristics 416. As described above with regard to FIG. 5, the one or more user device characteristics 416 may include one or more of the display resolution 502(1), the display color capability 502(2), or the redraw characteristics 502(3). For example, the one or more layout rules 422 may be configured to verify the user device 102 is able to process and present the markup language data 104 with the available display characteristics 502.

Block 814 analyzes the DOM data file, such as the DOM vector array 114, with the one or more layout rules 422 to determine variance in presentation of the one or more elements 206 from the one or more layout rules 422. This analysis may comprise a determination that one or more entries in the DOM vector array 114 satisfy, or fail to satisfy, the one or more layout rules 422. The determination of the variance may be a strict deviation from the layout rule, or include a magnitude or degree of the variance. In one example, the layout rules 422 may specify no overlap of elements 206 is allowed. In which case, even an overlap of 1 pixel results in an indication that the element 206 is out of compliance. In another example, the layout rules 422 may specify that some overlap is permitted up to a tolerance or threshold level. In this case, the overlap of 1 pixel may thus fail to result in an indication that the element 206 is out of compliance, or may include an indication of the degree of non-compliance, in this example a 1 pixel overlap. In one implementation, the analysis may comprise comparing the one or more entries in the DOM vector array 114 with the one or more layout rules 422.

Block 816 generates verification results 118 based at least in part on the analysis. Once generated, as described above the verification results 118 may be provided to the layout modification module 120 for corrective action of determined layout errors 106.

Figure 9:
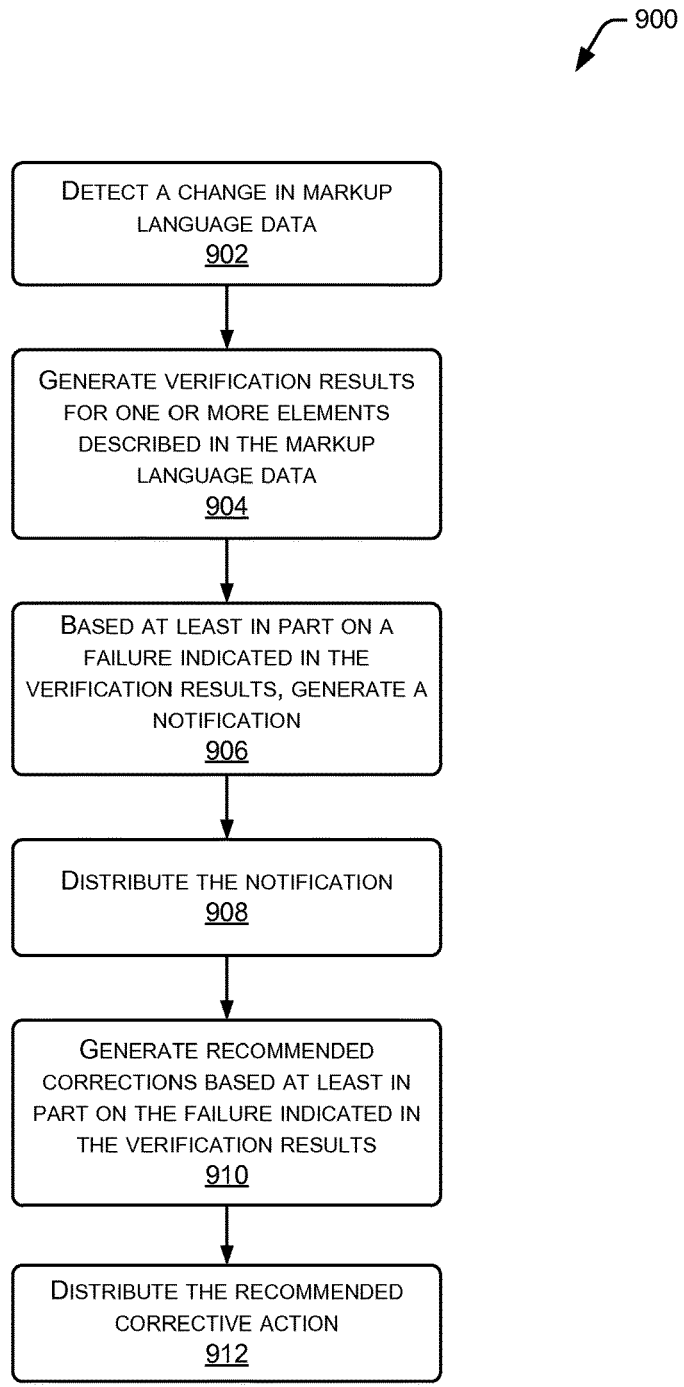
FIG. 9 illustrates a flow diagram of a process of automatically verifying layout of content.

FIG. 9 illustrates a flow diagram 900 of a process of automatically verifying layout of content provided using markup language data 104. This process may be implemented by the server 400 or other devices executing one or more of the rendering engine module 108, the DOM array generator module 112, the layout verification module 116, the layout modification module 120, or the markup language translation module 428.

Block 902 detects a change in the markup language data 104. In one implementation, the change may be detected by inspection of a change bit associated with the markup language data 104. When a process or party such as the designer 124 makes a change to previously tested markup language data 104, the change bit may be set, indicating a change. The modified markup language data 122, which is corrected to remove the layout errors 106, may have an associated change bit reset. In other implementations hashes, version control numbers, and so forth may be used to detect when a change has been made.

Block 904 generates verification results 118 for one or more elements described in the markup language data 104. For example, the verification results 118 may be generated as described above with regard to FIG. 8.

Block 906, based at least in part on one or more failures indicated in the verification results 118, generates a notification. This notification may comprise a portion of the verification results 118.

Block 908 distributes the notification, such as by using a network interface. The distribution may include sending the designer 124 or other human operator an email, text message, and so forth.

Block 910, based at least in part on the failure indicated in the verification results, generates one or more recommended corrections based at least in part on the failure indicated in the verification results 118. For example, the recommended corrections may indicate that a particular element failed due to an overlay error, and if the element were relocated 10 pixels to the left, the error would be eliminated.

Block 912 distributes the recommended corrective action. As with the notification, the recommended corrective action may be distributed. For example, the designer 124 may access a user interface provided by the user interface module 426 of the server 400 to view the recommendation to move the element 10 pixels to the left. By providing this recommended action, the designer 124 may be better able to provide a modified version of the markup language data 104 which will pass the verification.

In one implementation, the generation of the modified markup language data 122 may include presenting at least a portion of the markup language data 104 and at least a portion of the verification results 118 to the designer 124 or other user to correct. Modification input may be received from the user of the markup language data 104, correcting the one or more layout errors 106.

In another implementation, the generation of the modified markup language data 122 may be automatic. For example, the layout modification module 120 may be configured to automatically correct at least some of the layout errors 106 described in the verification results 118.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A computer implemented method comprising:
accessing markup language data comprising markup language elements;
processing the markup language data, with a headless browser without display in a graphical user interface, to generate a document object model ("DOM") tree;
based at least in part on the DOM tree, generating a single-hierarchical DOM data structure describing at least two elements in the markup language data, wherein the elements are representative of presentation of the markup language elements;
accessing two or more layout rules comprising a first layout rule and a second layout rule, wherein the first layout rule comprises a tolerance specifying that two or more elements overlaying one another during presentation constitutes a layout error, wherein the tolerance is represented by a first amount of pixels, wherein the second layout rule comprises a number of layers permitted to an element based at least in part on a rendering capability of a device;
determining a first application of the first layout rule to the DOM data structure;
determining a second application of the second layout rule to the DOM data structure;
determining that a layout error is not present in the second application;
determining that a layout error is present in the first application, wherein the layout error is represented by a first amount of pixels;
determining a second amount of pixels by which the layout error exceeds the tolerance;
generating verification results based at least in part on the second amount of pixels; and
generating, using the second amount of pixels, one or more corrective relocation recommendations including a third amount of pixels by which to displace at least one of the at least two elements.

2. The method of claim 1, wherein the single-hierarchical DOM data structure comprises a vector array of the one or more elements.

3. The method of claim 1, wherein the one or more layout rules further comprises at least one of:
a display size or an element placement parameter.

4. The method of claim 1, wherein the first layout rule is based at least in part on one or more user device characteristics.

5. The method of claim 4, wherein the one or more user device characteristics comprises at least one of:
display resolution,
display color capability, or
display redraw characteristics.

6. The method of claim 1, the processing further comprising applying one or more simulated user inputs to the markup language data.

7. The method of claim 1, further comprising
before the processing, translating the markup language data from a first markup language to a second markup language corresponding to the markup language data, wherein the first markup language is different than the second markup language.

8. A system comprising:
at least one memory storing computer-executable instructions; and
at least one processor configured to access the at least one memory and execute the computer-executable instructions to:
access markup language data comprising markup language elements;
process the markup language data, with a headless browser without display in a graphical user interface, to generate a document object model ("DOM") tree;
based at least in part on the DOM tree, generate a DOM vector array comprising entries in a single-hierarchical data structure, wherein the entries are representative of presentation of the markup language elements;
access two or more layout rules comprising a first layout rule and a second layout rule, wherein the first layout rule comprises a tolerance specifying that two or more elements overlaying one another during presentation constitutes a layout error, wherein the tolerance is represented by a number of pixels, wherein the second layout rule comprises a maximum number of markup language layers permitted;
determine a first application of the first layout rule to the DOM vector array;
determine a second application of the second layout rule to the DOM vector array;
determine that a layout error is not present in the second application;
determine that a layout error is present in the first application, wherein the layout error is represented by a first amount of pixels;
determine a second amount of pixels by which the layout error exceeds the tolerance of one or more conditions of the first layout rule;
generate verification results based at least in part on the second amount of pixels; and
generate one or more corrective relocation recommendations including a third amount of pixels by which to displace one or more markup language elements to satisfy the first layout rule, wherein the third amount of pixels is based at least in part on the second amount of pixels.

9. The system of claim 8, the markup language data comprising one or more of hyper-text markup language ("HTML"), or extensible markup language ("XML").

10. The system of claim 8, wherein the first layout rule is based at least in part on one or more user device characteristics.

11. The system of claim 8, the two or more layout rules further comprising one or more of:
a presentation size specifying maximum horizontal and vertical number of pixels available during presentation of data or an element placement parameter specifying where an element is permitted or disallowed during presentation of data.

12. One or more non-transitory computer-readable media storing computer-executable instructions that, when executed by at least one processor, configure the at least one processor to perform operations comprising:

detecting a change in markup language data associated with a document object model ("DOM") tree;

based at least in part on the DOM tree, generating, in a headless browser without display in a graphical user interface, a single-hierarchical DOM array describing elements in the markup language data, wherein the elements are representative of presentation of the markup language elements;

accessing two or more layout rules comprising a first layout rule and a second layout rule, wherein the first layout rule comprises a tolerance represented by a number of pixels specifying that two or more elements overlaying one another during presentation constitutes a layout error, wherein the tolerance is represented by a number of pixels, wherein the second layout rule comprises a number of layers permitted to an element based at least in part on a rendering capability of a device;

determining a first application of the first layout rule to the DOM array;

determining a second application of the second layout rule to the DOM array;

determining that a layout error is not present in the second application;

determining that layout error is present in the first application, wherein the layout error is represented by a first amount of pixels;

determining a second amount of pixels by which the layout error exceeds the tolerance;

generating a first verification result for one or more elements described in the markup language data;

based at least in part on a failure in the first verification result and further based at least in part on the second amount of pixels, generating a notification and a corrective relocation recommendation including a third amount of pixels by which to displace the one or more elements, wherein the third amount of pixels is based at least in part on the second amount of pixels; and distributing the notification and the corrective relocation recommendation.

13. The non-transitory computer-readable media of claim 12, the detecting the change comprising inspecting a change bit associated with the markup language data.

14. The non-transitory computer-readable media of claim 12, the distributing the notification comprising sending data using a network interface.

15. The non-transitory computer-readable media of claim 12, further comprising:

based at least in part on the first verification result, generating modified markup language data configured to correct the failure.

16. The non-transitory computer-readable media of claim 15, the generating modified markup language data comprising:

presenting at least a portion of the markup language data to a user;

presenting at least a portion of the first verification result to the user; and receiving modification from the user of the markup language data.

* * * * *